Figure 2:
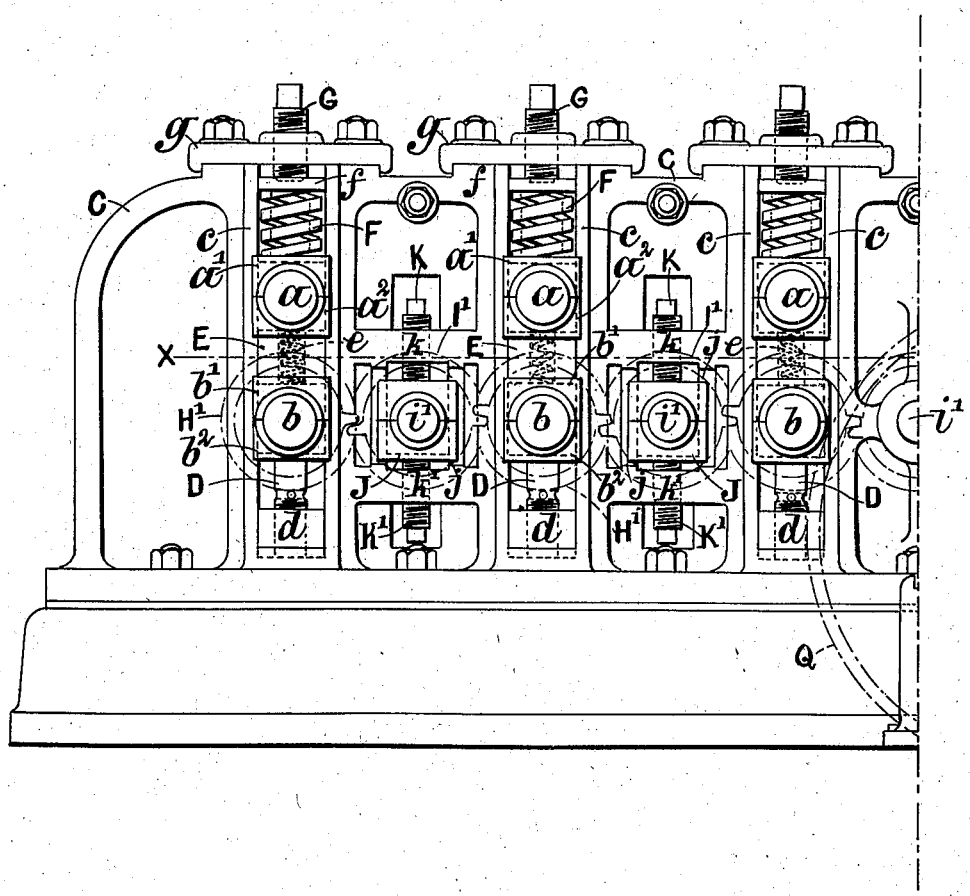

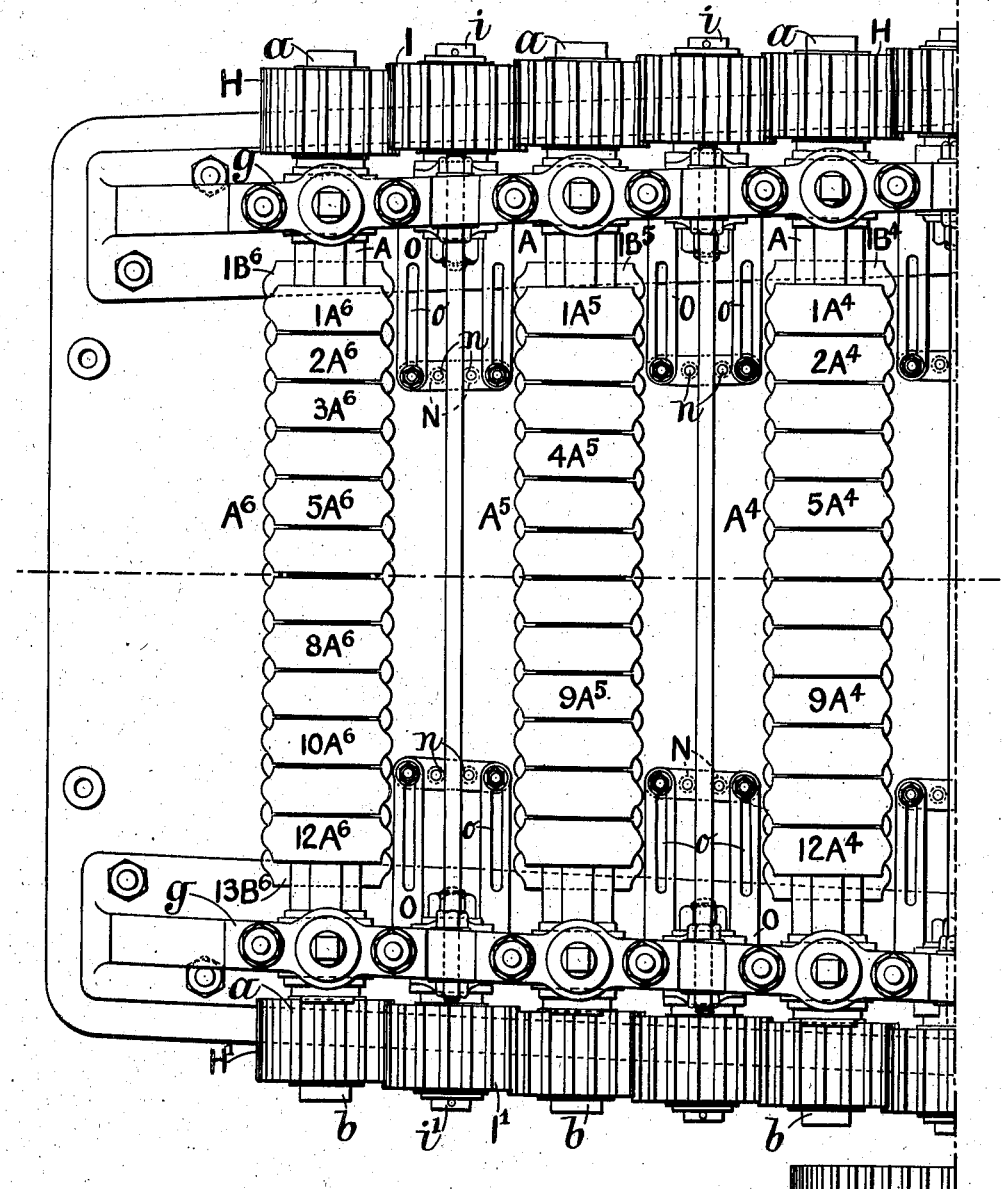

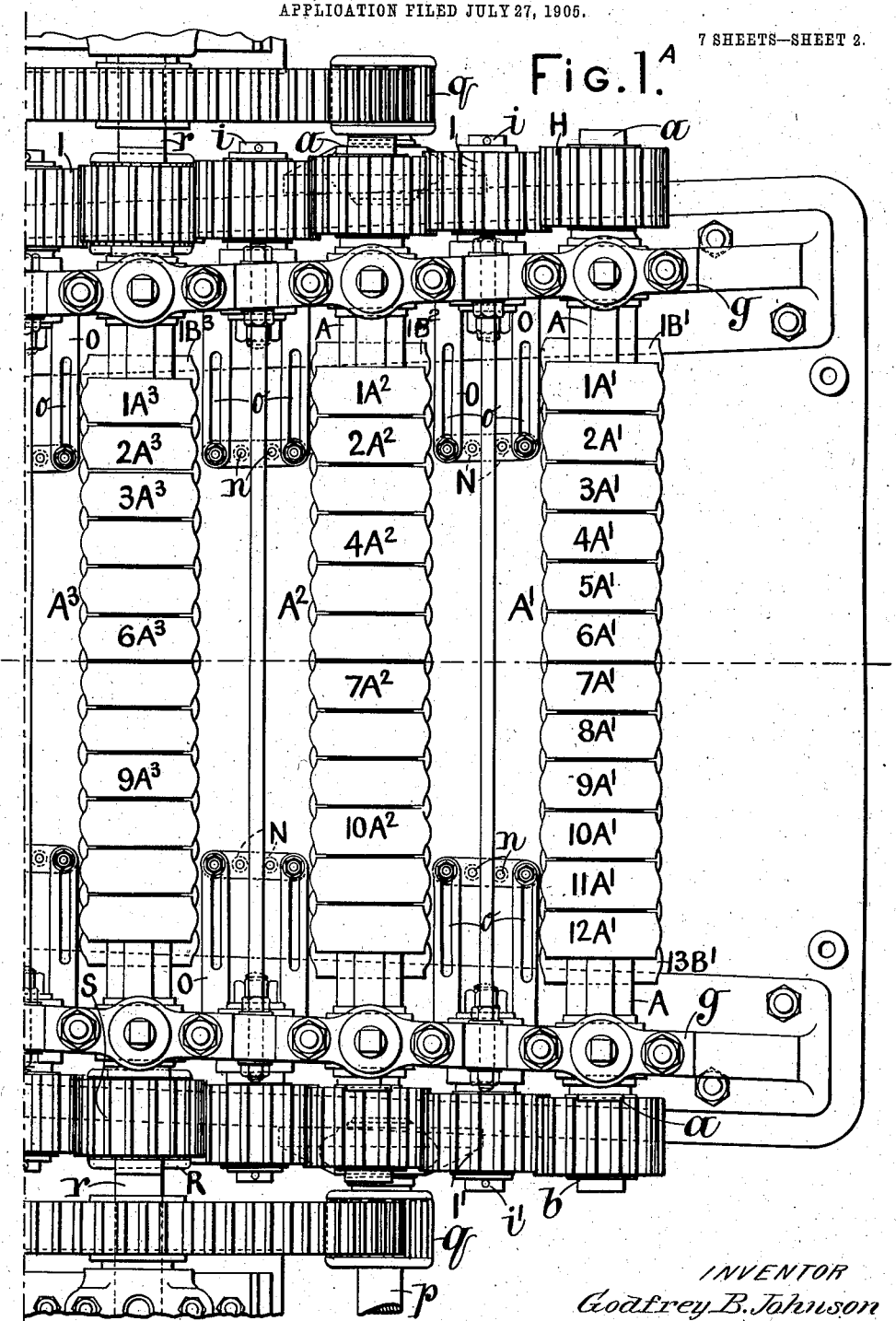

No. 815,710. PATENTED MAR. 20, 1906.
G. B. JOHNSON.
CORRUGATING MACHINE.
APPLICATION FILED JULY 27, 1905.

7 SHEETS—SHEET 3.

WITNESSES:
W. M. Avery
A. H. Davis

INVENTOR
Godfrey B. Johnson
BY
ATTORNEYS

No. 815,710. PATENTED MAR. 20, 1906.
G. B. JOHNSON.
CORRUGATING MACHINE.
APPLICATION FILED JULY 27, 1905.

7 SHEETS—SHEET 4.

Fig. 2$^A$.

WITNESSES:
W. M. Avery
A. H. Davis

INVENTOR
Godfrey B. Johnson
BY
Munn
ATTORNEYS

No. 815,710. PATENTED MAR. 20, 1906.
G. B. JOHNSON.
CORRUGATING MACHINE.
APPLICATION FILED JULY 27, 1905.

7 SHEETS—SHEET 7.

WITNESSES:
W. M. Avery
A. H. Davis

INVENTOR
Godfrey B. Johnson
BY
ATTORNEYS

UNITED STATES PATENT OFFICE.

GODFREY BENINGTON JOHNSON, OF LONDON, ENGLAND.

CORRUGATING-MACHINE.

No. 815,710.  Specification of Letters Patent.  Patented March 20, 1906.

Application filed July 27, 1905. Serial No. 271,457.

*To all whom it may concern:*

Be it known that I, GODFREY BENINGTON JOHNSON, engineer, a subject of the King of Great Britain, residing at 8 Victoria street, Westminster, London, England, have invented certain new and useful Improvements in Corrugating-Machines, of which the following is a specification.

This invention relates to a machine for producing a plurality of longitudinally-extending corrugations in a sheet of metal.

The invention is an improvement on that type of machine in which a strip is subjected to a process of continuous cold bending between pairs of rolls of progressively-varying contours, said machine comprising successive pairs of corrugating-rolls, all driven at the same angular velocity and having circumferential salient and circumferential reentering surfaces matching with one another, the contour of the surfaces varying progressively for successive pairs in such manner that while the maximum diameters of all the rolls remain equal the minimum diameters progressively diminish in successive pairs of rolls, whereof the axes are set progressively closer together.

The object of the present invention is to enable a machine of this type to be employed for producing shapes comprising a plurality of reverse curves and for bringing sheets of metal of any width to a corrugated cross-sectional form—such, for example, as is commonly required in roofing-sheets—whether the contour of the corrugations be regular and symmetrical or otherwise and whether the finished sheets be required to be flat or curved longitudinally.

According to the present invention each of the rolls for producing a number of corrugations or contours of reverse curvature side by side in a sheet of metal comprise an arbor and a series of roll-sections independently splined thereon and normally held a predetermined distance apart by spring-pressure, each section comprising a salient portion of the roll contour and the sections of successive pairs of rolls being of progressively-diminishing width and mounted at progressively-diminishing distances apart in accordance with the progressive diminution in the effective width of the sheet of metal during its passage through the machine. The arrangement is such that as a pair of rolls operate upon the sheet the sections of each roll of the pair will approach one another by sliding upon the arbor in accordance with the contraction simultaneously produced in the effective width of the sheet owing to the concurrent deepening of the corrugations, the normal distance apart of the sections of successive pairs of rolls being so adjusted that the sheet will be prepared by the action of one pair of rolls for entry between the next succeeding pair and will thus be subjected to a gradual and continuously-progressive process of cross-bending without suffering from sudden or violent strains.

Figure 3:
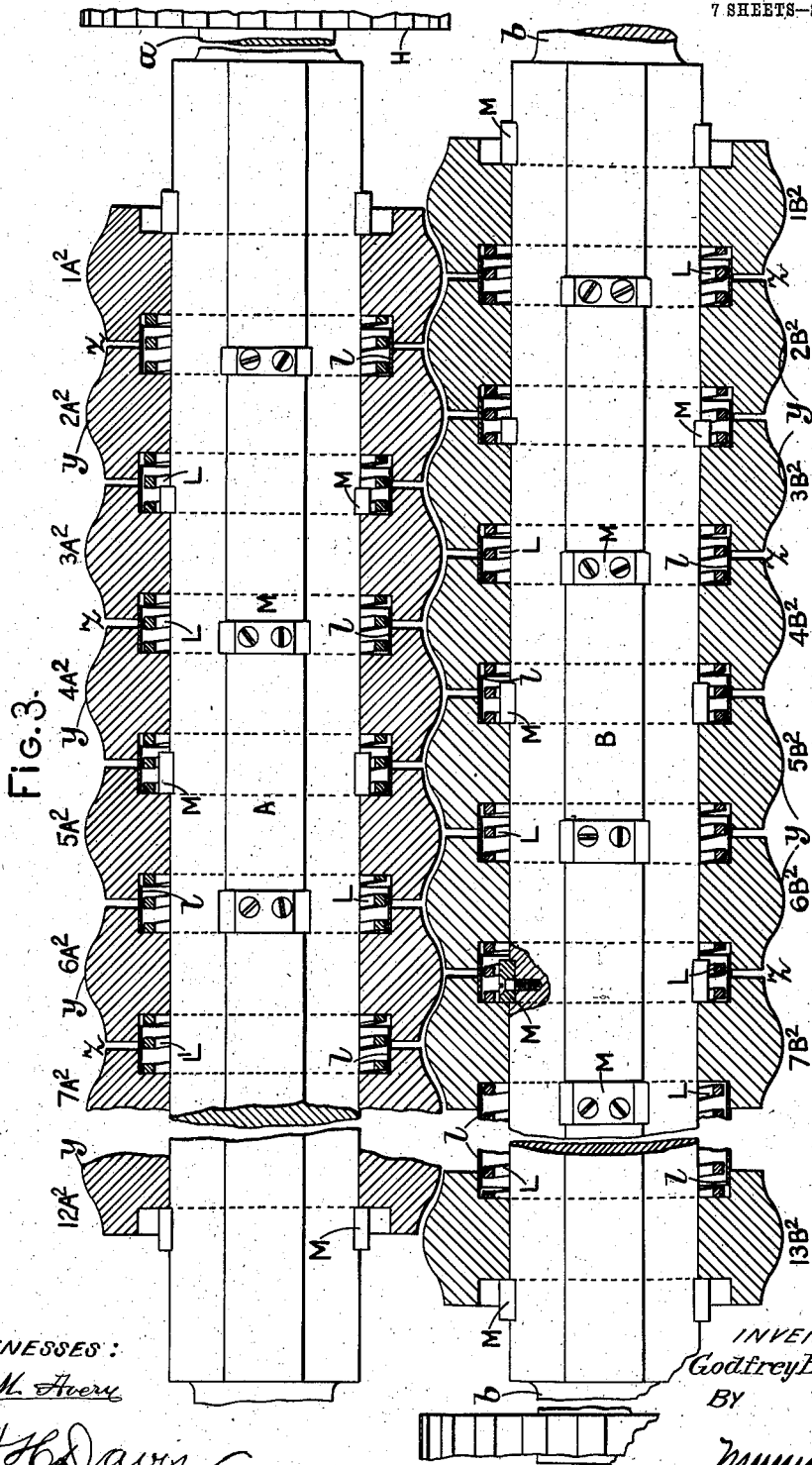
Figure 4:
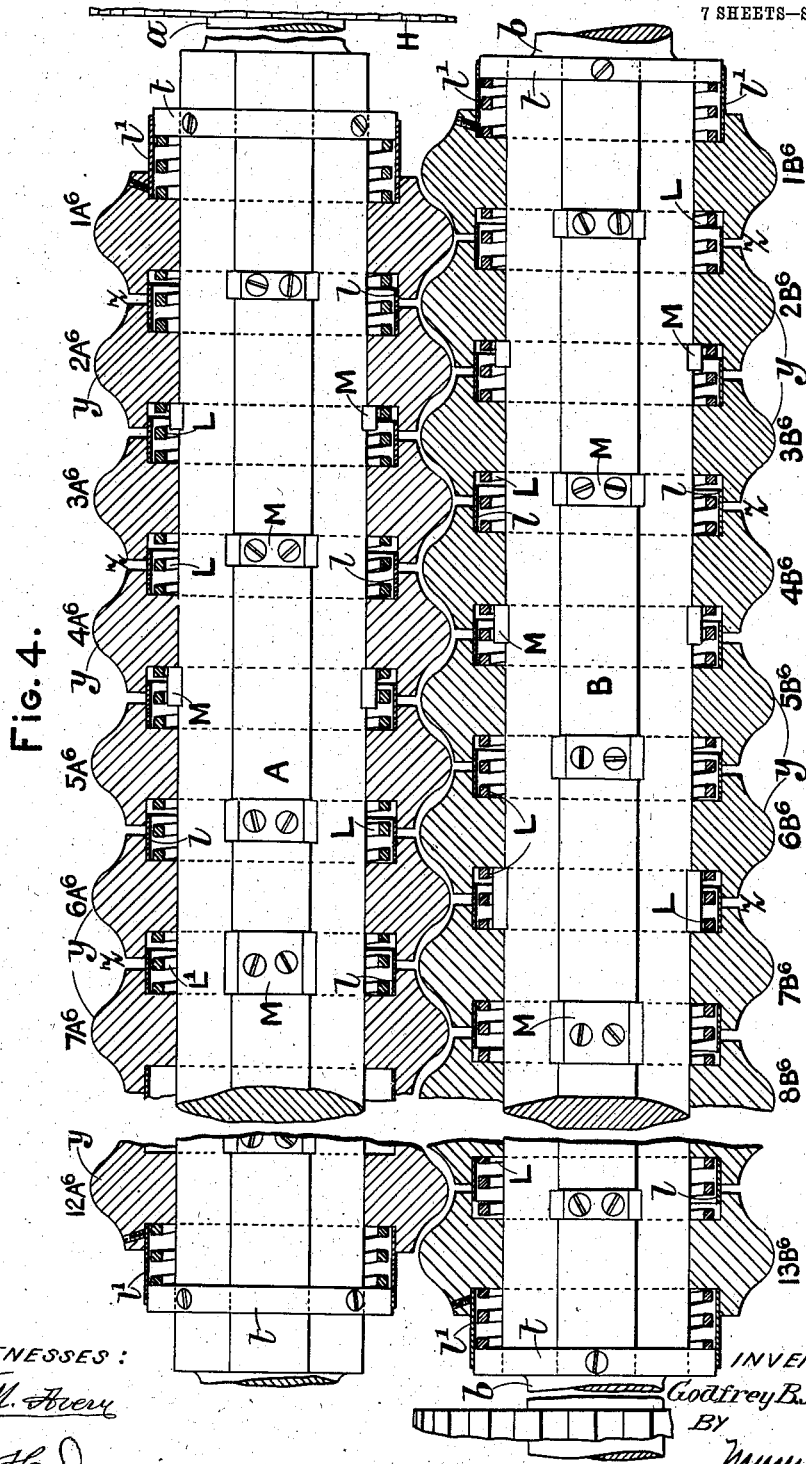
Figure 5:
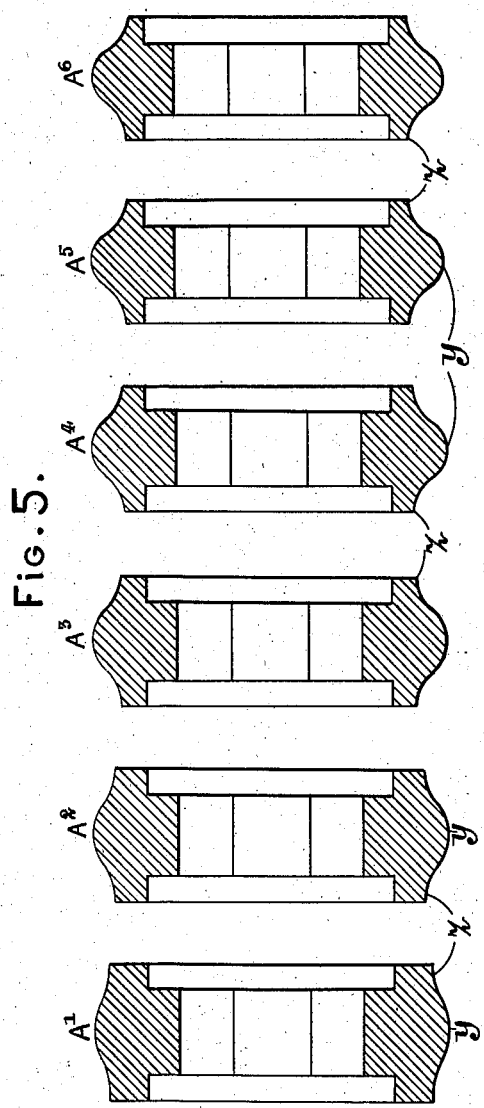

In the accompanying drawings, Figures 1 and 1$^A$ show a plan, and Figs. 2 and 2$^A$ a side elevation, of a machine having six pairs of rolls arranged for producing corrugated roofing-sheets of the ordinary type. Fig. 3 is a longitudinal section of a pair of corrugating-rolls, drawn to a larger scale, the section being taken on the common plane of the axes of both rolls; and Fig. 4 is a similar section of a pair of bending-rolls. Fig. 5 shows together, for purposes of comparison, a single roll-section from each of the six pairs of rolls employed in the machine illustrated in Fig. 2.

The machine comprises a series of consecutive pairs of rolls $A'$ $B'$ $A^2$ $B^2$, &c., having their main line of bite normally in a common plane which would usually be approximately horizontal, the end gudgeons $a$ $b$ of the arbors A B of the respective rolls being journaled in bearings which are adjustable in a direction perpendicular to the plane $x$ $x$, Fig. 2, wherein the sheet of metal under treatment is fed into the machine. For this purpose the bearings are fitted to slide in pairs of guides $c$ in the side frames C of the machine, each bearing for the upper series of rolls $A'$ $A^2$, &c., consisting of upper and lower half-bushes $a'$ $a^2$ and each bearing for the lower series of rolls $B'$ $B^2$, &c., consisting of upper and lower half-bushes $b'$ $b^2$. The lower half-bush $b^2$ of each lower roll $B'$ $B^2$, &c., rests upon an upright adjustable stop formed by a stud D, threaded to screw into a block $d$, fitting in the bottom of the guide $c$. The lower half-bush $a^2$ of each upper roll $A'$ $A^2$, &c., rests upon a distance-block E, which in turn rests upon the upper half-bush $b'$ of the corresponding lower roll, while elastic pressure is brought to bear upon the upper half-bush $a'$ of each upper roll by means of a powerful spring F, which takes its abutment against a set-screw G, adjustable through a cross-piece $g$ bridging the upper end of the pair of guides $c$, the screw acting upon the upper end of the spring through a plate $f$, fitted to slide in the guides. In order that in the event of the upper roll rising during working its lower half-bush $a^2$ may follow such upward movement of the roll-gudgeon $a$, a comparatively light helical spring $e$ is provided between the half-bushes $a^2$ and $b'$, this spring passing through a hole traversing the distance-block E from top to bottom. All the rolls of each series, upper and lower, are rotated in the same direction and at the same angular velocity, for which purpose there are keyed on the end gudgeons $a$ of all the rolls of the upper series at one side of the machine spur-wheels H of equal diameter, and between the spur-wheels of each two adjacent rolls of the series are provided idle wheels I, gearing with the wheels H on either side and fitted to rotate upon stationary studs $i$, carried by the side frame C. Similarly, on the end gudgeons $b$ of all the rolls of the lower series at the opposite side of the machine are keyed spur-wheels H' of equal diameter, between each adjacent two of which are provided idle wheels I', gearing with the wheels H' on either side and fitted to rotate on stationary studs $i'$, carried by the side frame C. By this means rotary movement communicated to any roll of the upper or lower series will be transmitted at equal angular velocity and in the same direction to the remaining rolls of the same series.

The studs $i$ and $i'$ throughout the machine may be, and those toward the delivery end of the machine are, made adjustable in the same direction as the roll-bearings, for which purpose each adjustable stud is carried by a block J, fitted to slide in guides $j$ in the side frame C of the machine, this block being supported in position by being held between upper and lower set-screws K K', adjustable through bridge-pieces $k$ $k'$ in the frame C. By properly adjusting the screws D, K, and K', appertaining to, say, the last three pairs of rolls in the machine, so as to throw their respective lines of bite progressively farther out of the common plane of the lines of bite of the remaining pairs of rolls in the machine, the sheets may be caused to leave the machine with any desired degree of curvature longitudinally of the corrugations.

Each of the rolls A' A², &c., or B' B², &c., of either series, upper or lower, is formed of a number of sections 1A' 2A' 3A', &c., 1A² 2A² 3A², &c., or 1B' 2B' 3B', &c., 1B² 2B² 3B², &c., independently splined upon the middle portion of the corresponding roll-arbor A or B, for which purpose the arbor may be of octagonal (or other convenient angular) form in cross-section, the aperture in each roll-section being made to fit and slide easily upon the arbor. Adjacent sections are forced apart by means of springs L, coiled in recesses provided in the opposed faces of the sections, the entry of dirt and grit into the recesses being prevented by means of sleeves $l$, which make a sliding fit in the opposed recesses of adjacent sections, as indicated. The normal position or distance apart of the sections is determined by a stop or stops M for each section, said stops being formed upon the arbor or fixed thereto—as, for example, in the manner indicated—and being adapted, while limiting the distance to which one roll-section is forced apart from the next by the action of the springs, to permit adjacent sections to approach one another as far as may be necessary when the rolls are in operation, as hereinafter described.

In order to provide an abutment or datum plane from which the action of each pair of rolls may take effect, a single section of one member of each pair of rolls is made a fixture on its arbor, the corresponding section of the same member (upper or lower) being fixed in the case of each pair of rolls throughout the machine. As a rule, and particularly in cases (such as that of the example chosen) of rolling ordinary plain or regularly-corrugated sheets, it is preferred to make the central section of one member—say the lower—of each pair of rolls a fixture upon its arbor, as indicated in Fig. 3, which is a longitudinal section of the second pair A² B² of the rolls shown in Fig. 1 and wherein the central roll-section 7B² of the lower roll B² of that pair is a fixture upon its arbor B. In consequence of this arrangement as a sheet passes through the machine there will be a tendency for its longitudinal center line to remain centrally of the width of all the rolls, the contraction of the sheet (due to the gradual deepening of the corrugations) taking effect from each edge of the sheet toward its center line and having for effect to cause the sliding roll-sections to approach the fixed section in opposition to the pressure of the springs. A roll-section other than the central section may, however, be made fast on the arbor, according to the contour to be produced, and in any case when the roll comes into operation the sliding roll-sections would be caused to approach the fixed section from one or both sides, according to the relative position of said fixed section, the amount of such sliding movement increasing of course with the distance of each sliding section from the section which is a fixture.

Each roll-section comprises a circumferentially-extending salient portion $y$ of the roll contour, said salient portion matching with and entering to a corresponding depth a circumferentially-extending grooved or reëntering portion $z$ of the other roll of the pair, this reëntering portion $z$ being formed partly in each of two adjacent sections of said roll, so that the sections of the two rolls of a pair "break joint" with one another, as shown in Fig. 3. Those salient portions which correspond with one another in successive pairs of rolls are of the same diameter throughout the machine, so that as all the rolls are driven at the same angular velocity their salient portions of maximum diameter have an equal surface velocity throughout the machine. The shaped profile constituted by the alternating salient portions $y$ and reëntering portions $z$ of the rolls is varied progressively for successive pairs of rolls, the variation of profile progressing by easy stages from the initial form wherein the difference in diameter between the portions $y$ and $z$ is least to the final form wherein such difference is greatest, each pair of rolls performing an equal or approximately equal share of the work from the inception to the completion of the required shape to be imparted to the sheet. Owing, therefore, to the fact that the salient portions $y$ of maximum diameter are equal in diameter for all the rolls throughout the machine, as before stated, the reëntering portions $z$ of minimum diameter gradually diminish in diameter for the rolls of successive pairs, and consequently the axes of the rolls of successive pairs are set progressively-closer together in correspondence with such diminution of minimum diameter.

Assuming the end gudgeons $a$ and $b$ of the upper and lower series of rolls to be of equal diameter throughout the machine and all the half-bushes $a^2$ or $b'$ of the roll-bearings of either series to be interchangeable, the distance-blocks E, whereby the half-bushes $a^2$ $b'$ (and consequently the journals of the roll-arbors) are held apart, are made of progressively-diminishing height, as indicated, so as to permit of the above-mentioned progressive approach of the axes of the two rolls in successive pairs. The height of said distance-blocks E is such that the distance maintained between the surfaces of the rolls of each pair is equal throughout the machine and so much greater than the thickness of the sheet operated on that the latter will not be nipped between the salient portions $y$ of the one roll and the reëntering portions $z$ of the other roll of a pair, but will contact only or mainly with the salient portions of both rolls. Hence as the salient portions $y$ of maximum diameter have an equal surface velocity throughout the machine the sheet is fed forward at the same speed by all the rolls from its entrance into the machine to its delivery therefrom and is not subjected to either tensile or buckling strains in the direction of its length while under treatment.

The roll-sections of successive pairs of rolls are of progressively-diminishing width (longitudinally of the roll axes) to extents proportional to the progressive increase in the depth and diminution in the width of the corrugations produced by the rolls and to the consequent progressive diminution in the effective width of the sheet of metal during its passage through the machine, and the stops M, whereby the minimum distances between the adjacent sections of a roll are determined, are set in such positions as to cause the roll-sections of successive pairs of rolls to be normally held apart at distances which correspondingly diminish progressively. As the sheet of metal passes between the rolls of a pair the several sections of each roll will be caused to slide longitudinally of the arbor in opposition to the pressure of the springs L, so as to approach that roll-section which is fast on the arbor, the extent of such sliding movement (which will, as before stated, increase with the distance of individual roll-sections from that section which is fast on the arbor) being in accordance with the contraction simultaneously produced in the effective width of the sheet, owing to the concurrent deepening of the corrugations, and the diminishing distances whereat the several sections of a roll are normally held apart by the stops M in successive pairs of rolls will have for effect to cause the sheet to be prepared by the action of one pair of rolls for entry between the rolls of the next succeeding pair, so that the sheet of metal will be subjected to a gradual and continuously-progressive process of reverse bending transversely of its width without being caused to suffer from the injurious strains which would be produced by sudden or violent distortions. In order to more effectually finish the metal sheet and better insure uniformity in the contour of the corrugations throughout the whole length of the sheet, it is preferred to make the last two (or more) pairs of rolls (as $A^5$ $B^5$ and $A^6$ $B^6$ in the example illustrated) at the delivery end of the machine identical in form.

Guides may be provided whereby the lateral margins of the metal sheet under treatment will be prepared after leaving one pair of rolls for entry between the next succeeding pair and for insuring the sheet maintaining a straight course in its passage through the machine. Such guides may consist, as indicated in Fig. 1, of pairs of antifriction-rollers N, mounted to turn at opposite sides of the machine upon spindles $n$, extending transversely of the general plane of the sheet under treatment and carried by brackets O, projecting inward from the side frames C of the machine intermediate between successive pairs of shaping-rolls, the spindles $n$ being adjustable in slots $o$, extending transversely of the machine in the brackets O, so as to enable the distance between the guide-rollers N at opposite sides of the machine to be adjusted to suit the width of the metal sheet under treatment.

Rotation is communicated in the first instance, preferably, to a pair of rolls about midway in the length of the machine, motion (in the example illustrated) being transmitted from a driving-shaft $p$, revolving at a relatively high speed and having a heavy flywheel P, through a toothed pinion $q$ on said shaft to a large gear-wheel Q on a counter-shaft $r$, a pinion R, on which, gears with the toothed wheel H' on the arbor of the lower member of the third pair of rolls $A^3 B^3$. This wheel H' transmits motion not only to the rolls of the lower series on either side, but also to the corresponding roll (and thence to the remaining rolls) of the upper series as well, the upper roll $A^3$ of the pair having a toothed wheel S, fast on the opposite end of its arbor to the wheel H, previously described, this wheel S on the roll $A^3$ gearing with the wheel H' on the roll $B^3$.

When the sheet of metal under treatment is to be not only corrugated, as described, but also bent longitudinally, it is necessary (before proceeding to the bending operation, which is performed, as before mentioned, by the terminal rolls, such as $A^5 B^5 A^6 B^6$ of the machine) to form the corrugations of a depth somewhat greater and of a width somewhat less than is ultimately required, so as by making proper allowance for the increase in width and decrease in depth of the corrugations, which occurs when the sheet is afterward bent longitudinally, to insure that the corrugations shall eventually be of the width and depth required, such allowance increasing with the increase in the degree of longitudinal curvature to be given to the sheet. In consequence of such widening of the corrugations during the bending operation it is necessary in the case of those terminal rolls, such as $A^5 B^5 A^6 B^6$, whereby the sheet is bent after being corrugated, to provide for the sliding roll-sections receding from the fixed section instead of approaching the latter, as before described with reference to the corrugating-rolls. Accordingly, as shown in Fig. 4, in the case of the bending-rolls the position of the stops M relatively to the roll-sections is reversed from that occupied by the stops M in the case of the corrugating-rolls, as shown in Fig. 3, so that whereas in the corrugating-rolls, Fig. 3, each spring L normally thrusts that roll-section which is contiguous to it on its outer side in a direction away from the fixed roll-section of the same or the other member of the pair of rolls in the bending-rolls, Fig. 4, each spring L normally thrusts that roll-section which is contiguous to it on its inner side in a direction toward the fixed roll-section of the same or the other member of the pair of rolls. Hence in the case of the bending-rolls, Fig. 4, those springs L whereby the outermost roll-sections are normally thrust inward against the corresponding stops M require to be provided with abutments in the form of collars $t$, fixed on the respective arbors, and the said outermost roll-sections carry sleeves $l'$, similar to those, $l$, previously described, but each adapted to slide over and make joint with the periphery of the corresponding collar $t$, as indicated.

It is to be observed that in the case of each corrugating or shaping roll successive springs L require to be of progressively-diminishing strength reckoning from the springs at either side of the fixed roll-section ($7B^2$ in the example illustrated in Fig. 3) of the one member of the pair of rolls or from the spring L' which separates those roll-sections of the other member of the pair which coöperate with said fixed roll-section, the ratio between the strengths of successive springs in each roll being such as to permit of all the sliding roll-sections moving inward along their arbor to proportionate extents when the roll comes into operation upon the sheet, so as to produce or deepen the corrugation. Conversely in the case of each bending-roll successive springs L require to be of progressively-increasing strength, reckoning from the springs at either side of the fixed roll-section ($7B^6$ in the example illustrated in Fig. 4) of the one member of the pair of rolls or from the spring L', which separates those roll-sections of the other member of the pair which coöperate with said fixed roll-section, the ratio between the strengths of successive springs in each roll being such as to permit of all the sliding roll-sections moving outward along their arbor to proportionate extents when the roll comes into operation upon the corrugated sheet, so as to bend the same longitudinally.

It is to be clearly understood that neither the number of corrugating or shaping rolls nor the number of terminal or bending rolls (if any of the latter be employed) is in any way limited to the number shown in the example illustrated, as any number of rolls of either kind may be employed, according to the nature or configuration of the section to be produced and the degree of longitudinal curvature (if any) given to the sheet.

I claim—

1. A machine for producing a plurality of longitudinally-extending corrugations in a sheet of metal, consisting essentially in the combination with successive pairs of roll-arbors all positively rotated at the same angular velocity, of a plurality of independent roll-sections carried by and rotatable with each of said arbors and separated from one another by a yielding medium, each roll-section comprising a circumferential salient portion adapted to match with the conversely-shaped surfaces of the coacting sections of the other roll of the pair, the width of the roll-sections diminishing progressively in successive pairs of rolls and the contours of the roll-sections varying progressively for successive pairs of rolls but the maximum diameters of all the roll-sections being equal while the minimum diameters progressively diminish for successive pairs of rolls, whereof the axes are set progressively closer together, substantially as specified.

2. In a machine for producing a plurality of longitudinally-extending corrugations in a sheet of metal, the combination with successive pairs of roll-arbors, of a plurality of independent roll-sections carried by and rotatable with each of said arbors, the widths of the roll-sections diminishing progressively in successive pairs of rolls and a single section in one member of each pair of rolls being fixed on its arbor while the remaining sections are arranged to slide but not to turn on their arbors; springs interposed between the adjacent sections of each roll, successive springs in a roll being of progessively - diminishing strength reckoning from the fixed roll-section to the sections farthest therefrom on either side; and stops on the roll-arbors adapted to limit the distances from said fixed roll-section to which the other roll-sections are forced by the springs, said distances diminishing progressively in successive pairs of rolls in accordance with the progressive diminution in the widths of the roll-sections, substantially as specified.

3. In a machine for producing a plurality of longitudinally-extending corrugations in a sheet of metal, consisting essentially of pairs of roll-arbors positively rotated and series of independent roll-sections carried thereby and rotatable therewith, each roll - section comprising a circumferential salient portion adapted to match with the conversely-shaped surfaces of the coacting sections of the other roll of the pair, the contours of the roll-sections varying progressively for successive pairs of rolls, but the maximum diameters of all the roll-sections being equal while the minimum diameters progressively diminish for successive pairs of rolls; the combination of bearing-blocks for the journals of said arbors, guides for said bearing-blocks disposed perpendicularly to the plane in which the sheet of metal is fed between the rolls, means for applying regulable elastic pressure to the bearing-blocks of the upper arbor of each pair, and distance-blocks interposed between the upper and lower bearing-blocks of each pair of arbors, adapted to maintain between the axes of each pair of arbors a minimum distance progressively diminishing for successive pairs in accordance with the progressive diminution in the minimum diameter of the sections of successive pairs of rolls and to maintain between the surfaces of the upper and lower members of each pair of rolls a minimum distance greater than the thickness of the sheet of metal under treatment, substantially as specified.

4. A machine for producing a plurality of longitudinally - extending corrugations in a sheet of metal consisting essentially of successive pairs of shaping-rolls constituted by roll-arbors all positively rotated at the same angular velocity and a plurality of independent roll-sections mounted on and rotatable with each of said arbors and separated from one another by a yielding medium, each roll-section comprising a circumferential salient portion adapted to match with the conversely-shaped surfaces of the coacting sections of the other roll of a pair, the contours of the roll-sections varying progressively for successive pairs of rolls, and the widths of the roll-sections diminishing progressively in successive pairs of rolls; in combination with pairs of lateral guide-rollers for the edges of the sheet of metal under treatment, mounted to rotate intermediate of successive pairs of shaping-rolls on axes at right angles to those of the shaping-rolls, the guide-rollers of successive pairs being set at progressively-diminishing distances apart in accordance with the progressively-diminishing width of the sheet of metal in its passage through the machine, substantially as specified.

5. A machine for producing a plurality of longitudinally - extending corrugations in a sheet of metal and for bending said sheet longitudinally of the corrugations when produced, consisting essentially in the combination with successive pairs of corrugating-rolls of successive pairs of bending - rolls adapted to receive the sheet of metal from the corrugating-rolls, and means for enabling the axes of the bending-rolls to be adjusted in a direction perpendicular to the plane wherein the sheet of metal is fed between the corrugating-rolls; the corrugating-rolls being constituted essentially by the combination with arbors in pairs all positively rotated at the same angular velocity, of series of independent roll-sections carried by and rotatable with each of said arbors and separated from one another by a yielding medium, and all having the same maximum diameter; and the bending-rolls being constituted by the combination with arbors in pairs all positively rotated at the same angular velocity as those of the corrugating-rolls, of a plurality of independent roll-sections carried by and rotatable with each of said arbors, all the roll-sections having the same maximum diameter as the sections of the corrugating-rolls and a single section in one member of each pair of rolls being fixed on its arbor while the remaining sections are arranged to slide but not to turn on their arbors, springs interposed between the adjacent roll-sections and between the extreme sections of each roll and abutments fixed toward the ends of the roll-arbors, successive springs in a roll being of progressively-increasing strength reckoning from the fixed roll-section to said abutments, and stops on each roll-arbor adapted to limit the approach toward the fixed roll-section of the other roll-sections of a pair under the pressure of the springs, substantially as specified.

6. In a machine for producing a plurality of longitudinally-extending corrugations in a sheet of metal and for bending said sheet longitudinally of the corrugations when produced, consisting essentially of successive pairs of corrugating-rolls positively rotated, successive pairs of bending-rolls adapted to receive the sheet of metal from the corrugating-rolls, and means for enabling the axes of the bending-rolls to be adjusted in a direction perpendicular to the plane wherein the sheet of metal is fed between the corrugating-rolls; the combination of bearing-blocks for the journals of the arbors of the bending-rolls, guides for said bearing-blocks disposed normally to the plane in which the sheet of metal is fed between the rolls, means for applying elastic pressure to the bearing-blocks of the upper roll of each pair, distance-blocks interposed between the upper and lower bearing-blocks of each pair of rolls, gear-wheels fast on the arbors of the upper and lower series of bending-rolls at the opposite ends thereof respectively, idle wheels intermediate between and gearing with the gear-wheels of the adjacent rolls of each series, blocks for supporting the axes of said idle wheels, guides for said blocks disposed normally to the plane in which the sheet of metal is fed between the rolls, means for adjusting in their respective guides the position of said blocks and that of the bearing-blocks for the arbors of the lower series of bending-rolls, and means for causing an arbor of the upper and of the lower series of bending-rolls to be positively rotated, substantially as specified.

GODFREY BENINGTON JOHNSON.

Witnesses:
GEORGE E. MINTERN,
RICHARD MORGAN.